(12) United States Patent
Wei et al.

(10) Patent No.: US 10,845,455 B2
(45) Date of Patent: Nov. 24, 2020

(54) EVENT DETECTION SYSTEM AND METHOD FOR VEHICLE

(71) Applicant: WISTRON NEWEB CORPORATION, Hsinchu (TW)

(72) Inventors: Ya-Ping Wei, Hsinchu (TW); Huai-Ming Chang, Hsinchu (TW); Tsun-Che Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 91 days.

(21) Appl. No.: 16/179,187

(22) Filed: Nov. 2, 2018

(65) Prior Publication Data

US 2020/0142024 A1 May 7, 2020

(51) Int. Cl.
*G01S 5/02* (2010.01)
*G01S 13/56* (2006.01)
*H04B 7/06* (2006.01)
*H01Q 1/32* (2006.01)
*H04B 1/38* (2015.01)

(52) U.S. Cl.
CPC ............ *G01S 5/0252* (2013.01); *G01S 13/56* (2013.01); *H01Q 1/32* (2013.01); *H04B 7/0626* (2013.01); *H04B 7/0634* (2013.01); *H04B 1/38* (2013.01)

(58) Field of Classification Search
CPC ......... G01S 5/0252; G01S 13/56; H04B 1/38; H04B 7/0626; H04B 7/0634; H01Q 1/32; H04L 41/0609
See application file for complete search history.

(56) References Cited

U.S. PATENT DOCUMENTS

| 10,380,881 | B2 * | 8/2019 | Xu ........................ G08B 13/187 |
| 2019/0158340 | A1 * | 5/2019 | Zhang .................. H04B 17/364 |
| 2019/0327124 | A1 * | 10/2019 | Lai ...................... H04L 25/0204 |

* cited by examiner

*Primary Examiner* — Dao L Phan
(74) *Attorney, Agent, or Firm* — Li & Cai Intellectual Property (USA) Office (57) ABSTRACT

An event detection system for a vehicle includes a transmitter and a receiver. The transmitter is disposed at a first position adjacent to a boundary of a space provided in the vehicle, including a first antenna having a transmitting direction, and the receiver is disposed at a second position adjacent to the boundary, which communicates with the transmitter and includes a second antenna having a receiving direction. The transmitter sends a probe signal toward the transmitting direction, and the receiver receives the probe signal. The receiver stores preset CSI. The preset CSI includes a first CSI and a normal CSI, the receiver obtains a current CSI from the probe signal by performing a time-reversal process, and to compare the current CSI to the preset CSI. When the first CSI is matched to the current CSI, a first event associated with the vehicle is determined to be occurred.

20 Claims, 10 Drawing Sheets

EVENT DETECTION SYSTEM AND METHOD FOR VEHICLE

FIELD OF THE DISCLOSURE

The present disclosure relates to an event detection system and an event detection method, and more particularly to an event detection system and an event detection method for a vehicle.

BACKGROUND OF THE DISCLOSURE

Children in vehicle compartments is a known danger. Various solutions have been developed for detecting objects in the vehicle compartments. For example, detection methods utilizing radar, ultrasonic, active and passive infrared, thermopiles, image sensors, carbon dioxide sensors, bolometers, and thermal imaging camera technologies.

Such systems may fail to detect the presence of, for instance, a sleeping or moribund child. In the case of car-jacking victims or the like who are placed in the trunk of a vehicle while unconscious, the unconscious victim will be unable to activate a manual release handle and/or move so as to trigger a motion detector.

In addition, the interior compartment of a vehicle represents a danger to both humans and pets, particularly during hot weather. In the summer months, the interior temperature of a car can exceed 150 degrees Fahrenheit due to the greenhouse effect from the glass windows. Children, in particular, can suffer life-threatening illnesses, most notably heat stroke, when exposed to temperatures of this level.

SUMMARY OF THE DISCLOSURE

In response to the above-referenced technical inadequacies, the present disclosure provides an event detection system and an event detection method for a vehicle that detect events associated with the vehicle by obtaining channel state information (CSI) from the time-reversal process.

In one aspect, the present disclosure provides an event detection system for a vehicle, including a transmitter and a receiver. The transmitter is disposed at a first position adjacent to a boundary of a space provided in the vehicle, including a first antenna having a transmitting direction, and the receiver is disposed at a second position adjacent to the boundary of the space provided in the vehicle, which communicates with the transmitter and includes a second antenna having a receiving direction. The transmitter is configured to send a probe signal toward the transmitting direction, and the receiver is configured to receive the probe signal. The receiver further includes a processor and a memory. The memory is coupled to the processor and configured to store a preset channel state information (CSI). The preset CSI includes a first CSI and a normal CSI, the processor is configured to obtain a current CSI from the probe signal by performing a time-reversal process, and to compare the current CSI to the preset CSI. When the first CSI is matched to the current CSI, a first event associated with the vehicle is determined to be occurred.

In another aspect, the present disclosure provides an event detection method for a vehicle, including: providing a transmitter at a first position adjacent to a boundary of a space provided in the vehicle, and the transmitter includes a first antenna having a transmitting direction; providing a receiver at a second position adjacent to the boundary of the space provided in the vehicle, wherein the receiver includes a second antenna having a receiving direction, a processor and a memory; configuring the receiver to communicate with the transmitter; configuring the transmitter to send a probe signal toward the transmitting direction; configuring the receiver to receive the probe signal; configuring the memory to store a preset channel state information (CSI), wherein the preset CSI includes a first CSI and a normal CSI; configuring the processor to obtain a current CSI from the probe signal by performing a time-reversal process, and compare the current CSI to the preset CSI. When the first CSI is matched to the current CSI, a first event associated with the vehicle is determined to be occurred.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
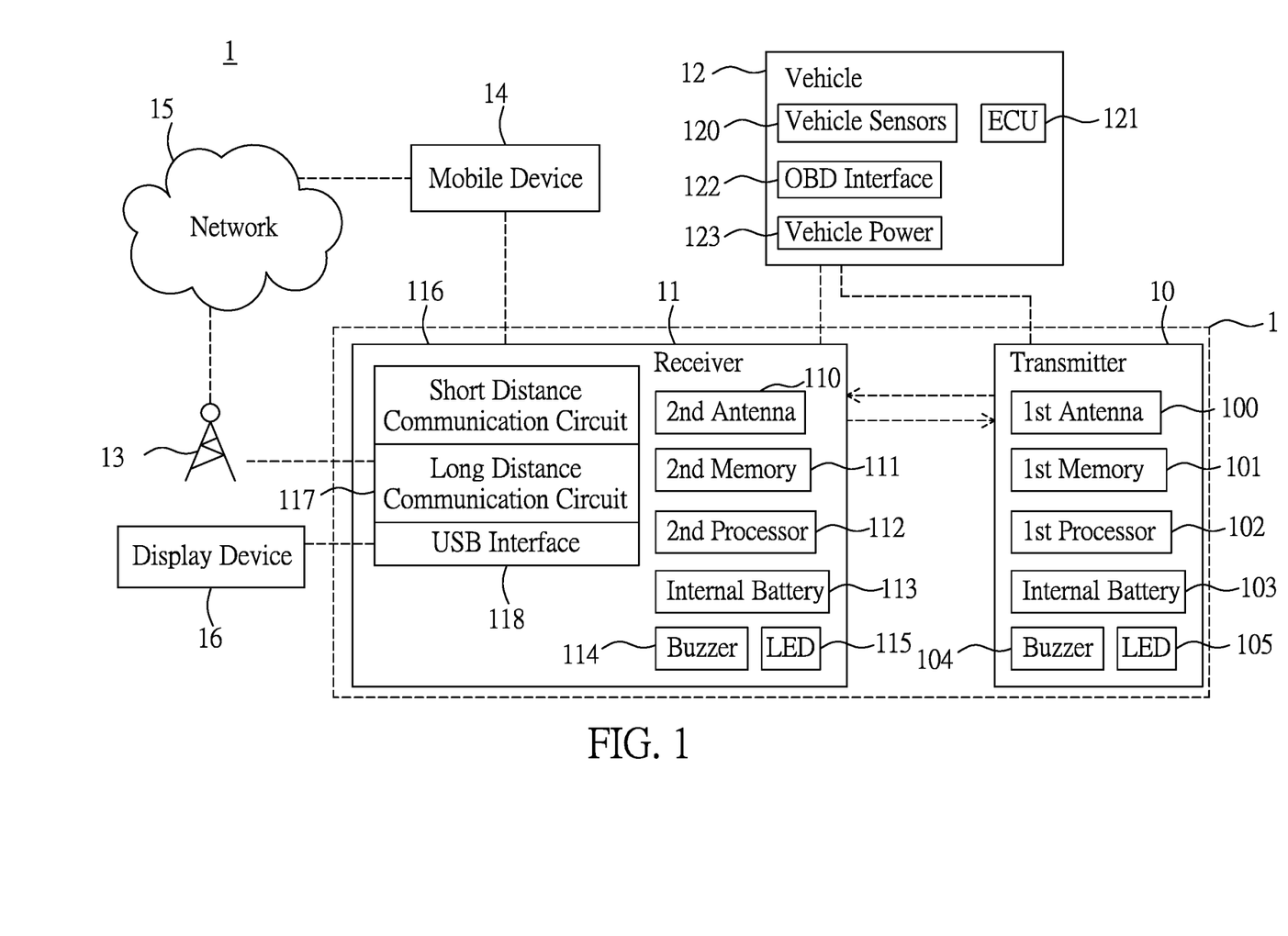
FIG. 1 shows a block diagram of an event detection system according to an exemplary embodiment of the present disclosure.

Referring more particularly to the drawings, embodiments of the disclosure may be described in the context of the event detection system as shown in FIG. 1.

As shown in FIG. 1, a block diagram of an event detection system for a vehicle is depicted in accordance with an exemplary embodiment of the present disclosure. The event detection system 1 may be implemented in any type of vehicle. In this embodiment, the event detection system 1 may include a transmitter 10 and a receiver 11. As shown in FIG. 1, the transmitter 10 includes a first antenna 100, a first memory 101, a first processor 102, an internal battery 103, a buzzer 104 and a light emitting device (LED) 105. Similarly, the receiver 11 includes a second antenna 110, a second memory 111, a second processor 112, an internal battery 113, a buzzer 114 and a light emitting device (LED) 115. It should be noted that transmitter 10 and receiver 11 are also capable of transceiving signals.

Figure 2A:
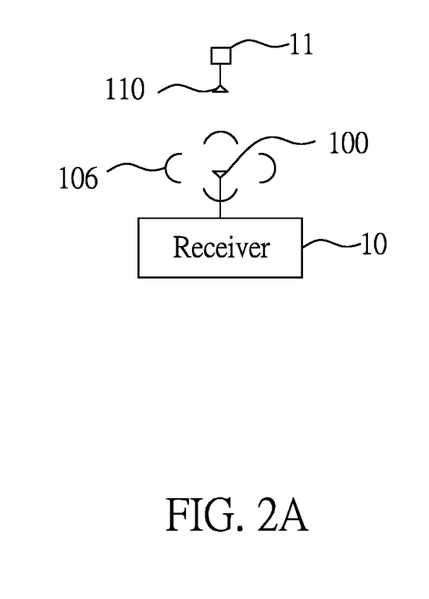
FIG. 2A shows an example of a radiation-pattern-reconfigurable antenna for the first antenna of the transmitter according to the exemplary embodiment of the present disclosure.

In the present embodiment, the first antenna 100 and the second antenna 110 may each be a single antenna or an antenna array. Either a single antenna or an antenna array could be a Radiation-Pattern-Reconfigurable Antenna which can generate radiation pattern with a specific direction. As shown in FIG. 2A, which shows an example of a radiation-pattern-reconfigurable antenna for the first antenna of the transmitter according to the exemplary embodiment of the present disclosure. In the example, the pattern reconfiguration antenna is provided with four reflectors surrounding the single antenna 100, which makes the antenna directional. In achieving more angular resolution, more reflectors could be disposed.

In other embodiments, the antenna array may also be utilized by using beam-forming techniques to achieve radiation patterns with multiple directions. In certain embodiments, the first antenna 100 of the transmitter 10 may include a smart antenna, which sends a wireless signal that propagates through a wireless channel and arrives at the second antenna 110 of the receiver 11 as a multipath wireless signal.

Further, the first processor 102 may controls the first antenna 100 of the transmitter 10 to transmit signals in different frequency bands, in different directions, and/or in different polarizations, in the same or similar frequency bands, in the same or similar directions, and/or in the same or similar polarizations. In some embodiments, the first processor 102 may adjust carrier frequency, direction and/or polarization of signal transmissions and signal receptions. Specifically, the first processor 102 can be configured to adjust the first antenna 100 to comply with the IEEE 802.11 standard. The IEEE 802.11 standard can include at least one of IEEE 802.11a, IEEE 802.11b, IEEE 802.11g, IEEE 802.11n, IEEE 802.11ac, or IEEE 802.11ad standards. Preferably, the processor 102 can be configured to adjust the transmitter 10 to be comply with 802.11ad (60 GHz Wi-Fi). Basically, the wider frequency band width may increase the precision of detection by obtaining more CSI, and would assist the determination of existence of the object. Moreover, in 802.11ad standard, the multi-antenna antenna array may be utilized for concentrating more energy while scanning in multiple directions.

Specifically, in the architecture as shown in FIG. 1, the event detection system utilizes scattered waves caused by sending the probe signal through the space to be detected in the vehicle. That is, the system obtains the channel state information (CSI) after the probe signal is processed by the time-reversal (TR) process to determine whether an event occurs and to estimate the approximate a position where the event occurred. The CSI is information that can represent the channel properties of a communication link to thereby estimate the channel. More specifically, the CSI describes how a signal propagates from the transmitter(s) to the receiver(s) and reveals the combined effect of, for instance, scattering, fading, and power decay with distance, and the CSI may include information of amplitudes and phases for performing a cross-matching operation.

In detail, TR process including a channel probing phase and a TR transmission phase, during the channel probing phase, the transmitter 10 sends a probe signal, such as an impulse, to the receiver 11, which produces an estimated CSI for the multipath channel between the transceiver 10 and the receiver 11. Then, the corresponding characteristic parameters of CSI is obtained by time-reversing and conjugating the estimated CSI. During the TR transmission phase, the receiver 11, if provided with transmission capabilities, can transmit back the time-reversed and conjugated CSI and generates a spatial-temporal resonance at the transceiver 10 by fully collecting and concentrating the energy of the multipath channel. Alternatively, the receiver 11 may directly store the time-reversed and conjugated CSI without transmitting the time-reversed and conjugated CSI. The TR spatial-temporal resonance can be viewed as the resonance of EM field in response to the environment, also known as the TR focusing effect.

In more detail, the event detection system 1 of the present embodiment exploits the intrinsic property of TR technique that the spatial-temporal resonance fuses and compresses the information of the multipath propagation environment. To implement the indoor events detection based on the TR spatial-temporal resonances, the detection operation consists of two phases: the offline training and the online testing.

During the offline training phase, a database is built where the multipath profiles of any targets are collected and stored as the TR signatures. Suppose there are n Event Si, the n Event Si represent a variety of vehicle events defined by the user. The corresponding training CSI samples are estimated and form a matrix Hi, which is defined as following equation (1):

$$H_i = [h_{i,t0}, h_{i,t1}, \ldots, h_{i,tN-1}] \quad (1)$$

where N is the size of CSI samples for a training event. $h_{i,tj}$ represents the estimated CSI vector of event $S_i$ at time tj and $H_i$ is named as the CSI matrix for event $S_i$. The corresponding TR signature matrix $G_i$ can be obtained by time-reversing the conjugated version of $H_i$ as following equation (2):

$$G_i = [g_{i,t0}, g_{i,t1}, \ldots, g_{i,tN-1}] \quad (2)$$

Where the TR signature $g_{i,t\_j[k]} = h^*_{i,t\_j|L-k|}$ is the time-reversed and conjugated version of $h_{i,t\_j}$. Then the training database G is the collection of $G_i$'s. The training database G is then stored in the memory 111.

After constructing the training database G, the event detection system 1 is ready for real-time vehicle event detection. In this regards, the event associated to the vehicle is detected through matching its multipath profiles to TR signatures in the training database G. By leveraging the TR technique, the dimensions of the CSI may be able to be naturally compressed through mapping them into the strength of the spatial-temporal resonances. The strength of the spatial-temporal resonance (TRRS) TR(h1, h2) between two CSI samples h1 and h2 is defined as following equation (3):

$$TR(h_1, h_2) = \left( \frac{\max_i |(h_1 * g_2)[i]|}{\sqrt{\sum_{l=0}^{L-1} |h_1[l]|^2} \sqrt{\sum_{l=0}^{L-1} |h_2[l]|^2}} \right)^2 \quad (3)$$

Where "*" denotes the convolution and $g_2$ is the TR signature of $h_2$ as, $g_2[k]=h_2|L-k-1|$, $k=0, 1, \ldots, L-1$. During the online monitoring phase, the processor 112 keeps matching the current estimated CSI to the TR signature in G to find the one that yields the strongest TR spatial-temporal resonance, computed by the testing CSI matrix H and the signature matrix $G_i$ for each trained events $S_i$.

Specifically, the event detection system 1 can be used for recognizing a positional motion in a vehicle interior to detect whether an object, such as a person or an animal, is in the vehicle, so as to reduce the occurrence of a tragic death or suffocation caused by a person or an animal in the vehicle. Furthermore, the event detection system 1 provided by the present disclosure may be applied to any type of the vehicle.

It should be noted that the positions and directions of the antennas, such as the first and second antennas 100 and 110, significantly affect an accuracy of the event detection. That is, the number of the multipath inside of the space in the vehicle depends on the positions of the transceiver 10 and the receiver 11. In order to achieve high accuracy of the event detection, the transmission between the transmitter 10 and the receiver 11 should be performed on the basis of strong and abundant multipath effects.

Figure 2B:
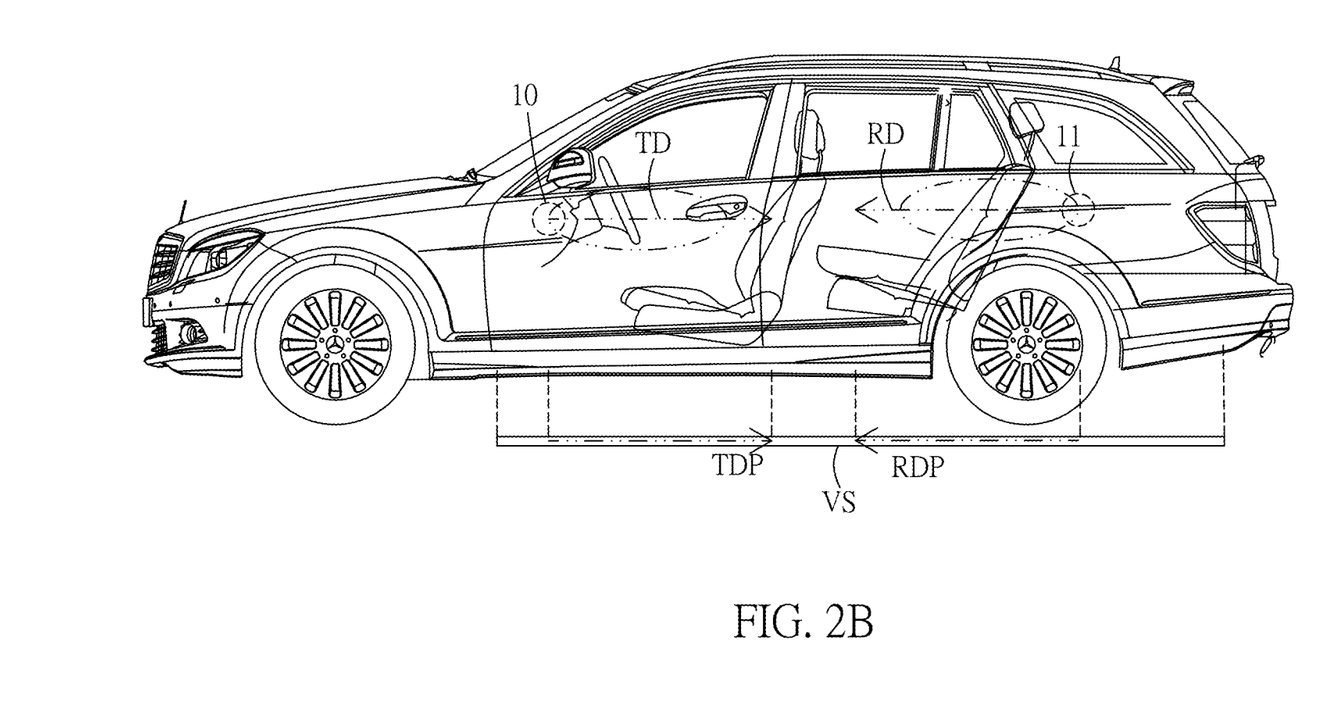
FIGS. 2B, 2C and 2D are diagrams showing arrangements of the transmitter and the receiver in a vehicle space.
Figure 2C:
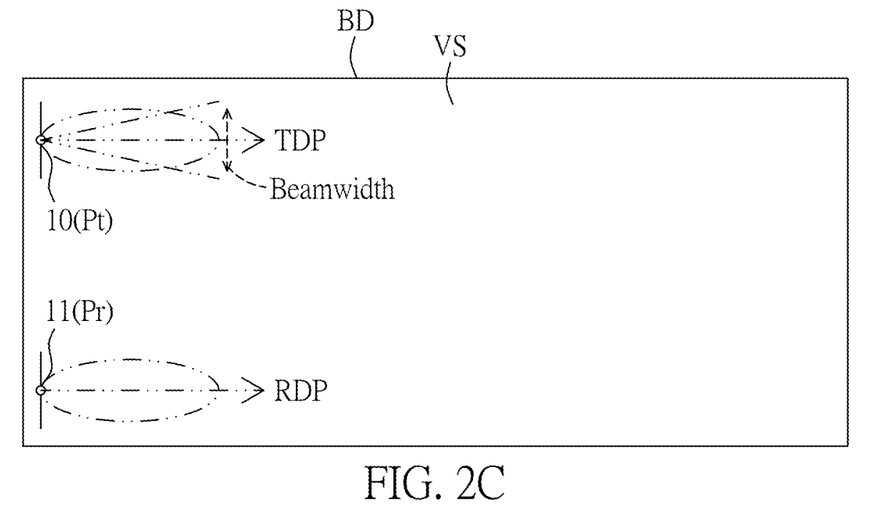
Figure 2D:
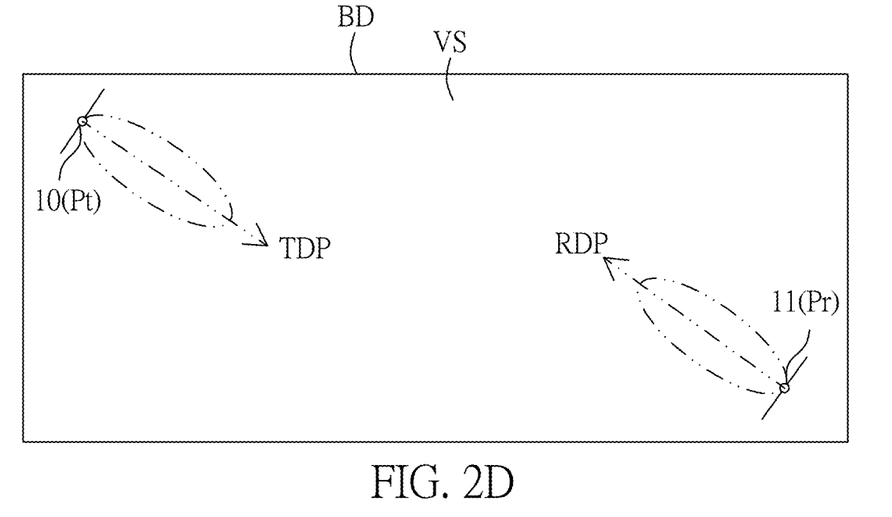

Reference is now made to FIGS. 2B, 2C and 2D, which are diagrams showing arrangements of the transmitter 10 and the receiver 11 in a vehicle space VS. As shown in FIGS. 2B, 2C and 2D, the transmitter 10 is disposed at a first position Pt adjacent to a boundary BD of the vehicle space VS provided in the vehicle, including the first antenna 100 having a transmitting direction TD, and the receiver 11 is disposed at a second position Pr adjacent to the boundary BD of the vehicle space VS provided in the vehicle, including the second antenna 110 having a receiving direction RD, and the receiver 11 is communicated with the transmitter 10.

For example, the first and second positions Pt and Pr should be in a housing of the vehicle while located at the outside of the boundary, or the first and second positions should be in the space while located the inside of the boundary. It should be noted that the first and second positions Pt and Pr should be positions inside the car close to the boundary, and a non-line of sight configuration is required to avoid excessive strength of the single path while increasing the number of multipath. Line-of-sight propagation is a characteristic of electromagnetic radiation propagation, which means waves travel in a direct path from the transceiver 10 to the receiver 11 without passing through any obstacles, such as seats, seat belts, the gear stick, etc. in the vehicle.

Furthermore, taking directional antennas for example, a peak gain direction of the antenna serves as the transmitting/receiving directions TD/RD for the transmitter 10/receiver 11, and the beamwidth thereof is considered as a reference for a rotatable angle associated with the transmitting/receiving directions TD/RD.

In FIGS. 2B, 2C and 2D, the vehicle space VS is simplified by projecting the vehicle space on the ground (X-Y plane), and the transmitting and receiving directions TD and RD are projected on the X-Y plane while considering the 3-dimensional vehicle space, that is, first and second projection directions TDP and RDP, which are components projected by the peak gain directions of the first antenna 100 and the second antenna 110 on the X-Y plane are shown in FIGS. 2C and 2D. Preferably, a positional relationship between the first position Pt and the second position Pr provides the non-line of sight link between the transmitter 10 and the receiver 11. In such cases, the first position Pt and the second position Pr are selected as follows:

Any two points adjacent to the boundary BD may be selected for disposing the transmitter 10 and the receiver 11, and the transmitting and receiving directions TD and RD are set to point toward the inside of the vehicle space VS while being substantially parallel to each other. As shown in the cases of FIGS. 2C and 2D, the transmitter 10 and the receiver 11 are disposed at two corners of one side (FIG. 2C), or at diagonal corners (FIG. 2D) of the vehicle space VS while avoiding providing the line of sight link therebetween.

Figure 2E:
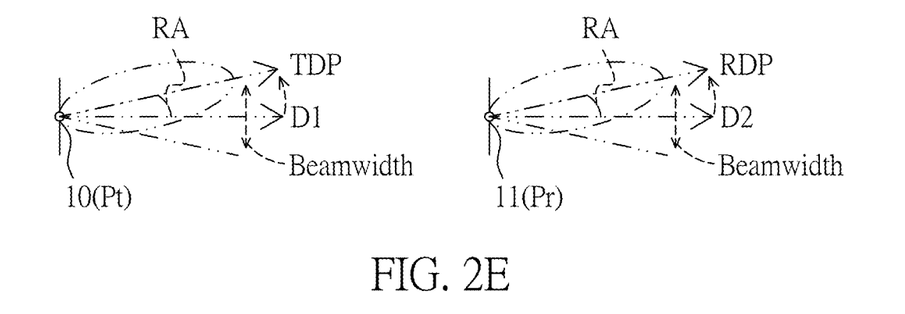
FIG. 2E is a diagram showing rotatable angles for the first and second projection direction and with respective to the first and second directions.

Furthermore, reference is now made to FIG. 2E, which is a diagram showing rotatable angles for the first and second projection direction and with respective to the first and second directions according to the present disclosure. Taking the first and second projection directions TDP and RDP mentioned above as a first and second direction D1 and D2, rotatable angles RA for the first and second projection direction TDP and RDP with respective to the first/second direction D1/D2 is a complement angle of the beamwidth. In a radio antenna pattern, the beamwidth is defined by the half power beamwidth, being an angle between the half-power (−3 dB) points of the main lobe of the radiation pattern, when referenced to the peak effective radiated power of the main lobe. For example, if the beamwidth of the transmitter 10 and the receiver 11 are 40 degrees and 70 degrees, respectively, the rotatable angles RA for the transmitter 10 and the receiver 11 are ±70 degrees and ±55 degrees, respectively. Alternatively, the beamwidth may be defined by a threshold set by a user.

In other words, in cases of non-line of sight, the peak gain directions, or the projected components on X-Y plane of the peak gain directions of the transmitter 10 and the receiver 11, should be substantially parallel to each other. For example, the definition of "substantially parallel" can be defined that an angle between the peak gain directions of the transmitter 10 and the receiver 11 is within ±10 degrees.

Furthermore, after the peak gain directions of the transmitter 10 and the receiver 11 are determined, those can be set as reference directions. Taking the reference directions as center directions, the transmitting direction TD and the receiving direction RD can be set within a first rotational angle range and a second rotational angle range. The first rotational angle range may be determined according to the beamwidth of the first antenna 100, and the second rotational angle range may be determined according to the beamwidth of the second antenna 110. Therefore, the peak gain direction of the first antenna 100 is rotatable in the first rotational angle range, and the peak gain direction of the second antenna 110 is rotatable in the second rotational angle range. It should be noted that the direction of the peak gain may be a normal direction (propagation direction) of wave planes of the antenna.

Figure 3:
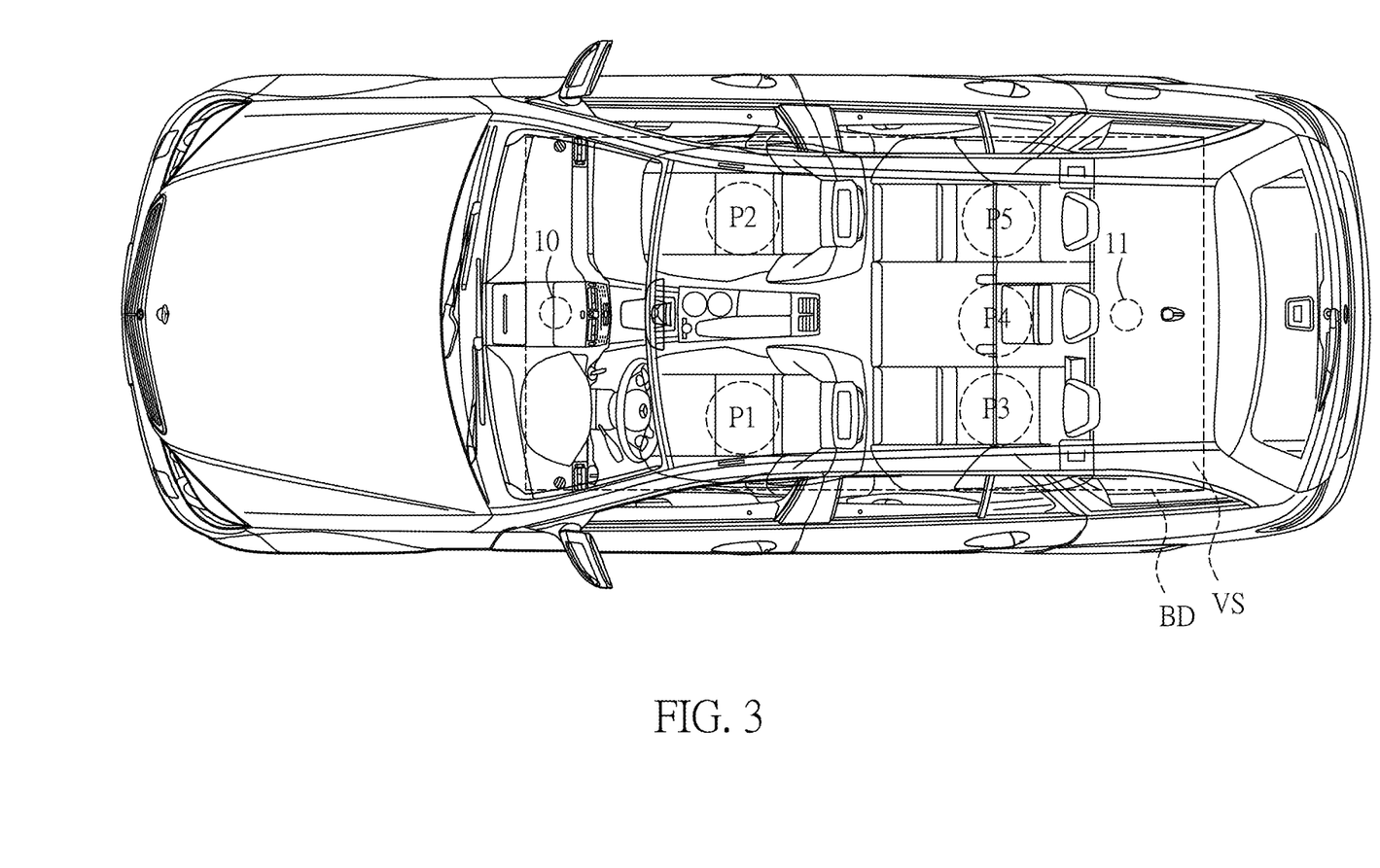
FIG. 3 is an event detection arrangement associated with a positional motion in the vehicle space.

Reference is now made to FIG. 3, which is an event detection arrangement associated with a positional motion in the vehicle space. In order to recognize which position has positional motions in the vehicle space, the TRRS equation (3) is utilized by substituting the obtained CSI (Channel State Information) into the calculation. The calculation is based on the number of paths generated by the reflections and refractions in the vehicle. Assuming that the number of the paths is 20, then the obtained CSI with i=1~20 are substituted into the calculation.

In this case, a plurality of events, including six states, are defined in the vehicle space VS.

State S0 means no positional motion is generated in the vehicle space VS.

State S1 indicates that there is a positional motion generated at a position P1.

State S2 indicates that there is a positional motion generated at a position P2.

State S3 indicates that there is a positional motion generated at a position P3.

State S4 indicates that there is a positional motion generated at a position P4.

State S5 indicates that there is a positional motion generated at a position P5.

Here, the states refer to the state to be detected, and are not limited to the motions. The states to be detected may be actions such as gestures, swinging, bending, etc., and can be distinguished which seat has the action. Other actions such as breathing, opening the door, etc. can also be used to define the states to be detected. Special action behavior like characteristic, frequency, intensity may be collected as a basis for assisting the event detection.

In order to implement the event detection in the vehicle space VS based on the TR spatial-temporal resonances, the event detection operation consists of the offline training phase and the online testing phase.

During the offline training phase, six events are provided for establishing the preset CSI, which includes a normal CSI, a first CSI through a fifth CSI. The normal CSI corresponds to the state S0, which means that no action generated in the vehicle space VS, and the first CSI corresponds to the state S1 that there is an action generated at position P1, and so for the second CSI through the fifth CSI. Specifically, the first CSI and the normal CSI are respectively obtained by performing a time-reversal operation on the probe signal in response to the state S1 and the state S0 occurred in the vehicle space VS.

Figure 4:
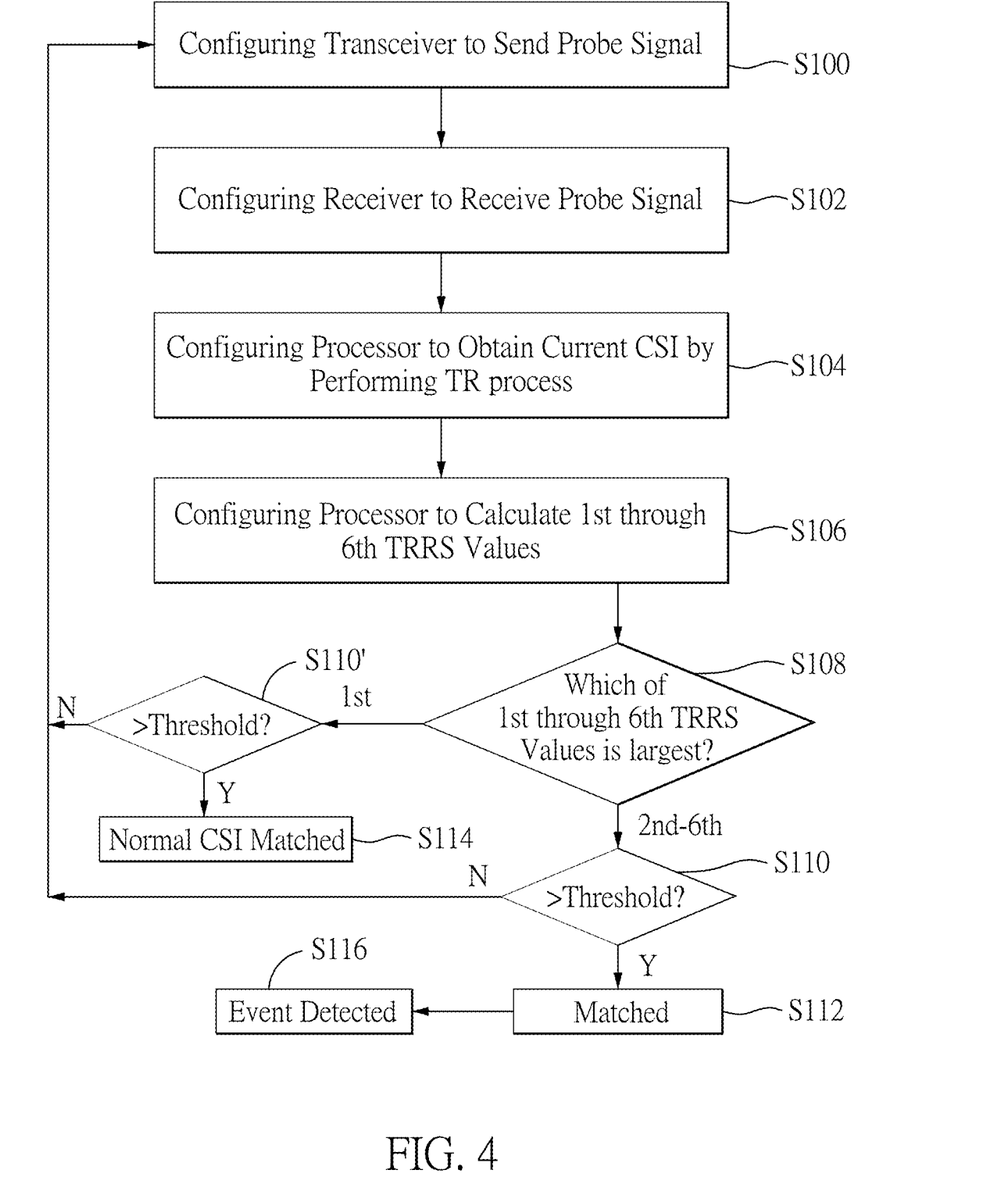
FIG. 4 shows a flow chart for detecting events associated with the vehicle according to an embodiment of the present disclosure.

Reference is now made to FIG. 4, which shows a flow chart for detecting events associated with the vehicle according to an embodiment of the present disclosure. During the online monitoring phase, the method proceeds to step S100, configuring the transceiver 10 to send a probe signal.

Step S102, configuring the receiver 11 to receive the probe signal.

Step S104, configuring the processor 112 to obtain a current CSI from the probe signal by performing the TR process.

Step S106, configuring the processor 112 to calculate first through sixth time-reversal resonating strength (TRRS) values between the current CSI and the preset CSI, including the normal CSI, and the first through fifth CSI.

After the first through sixth TRRS values are obtained, proceed to step S108, configuring the processor 112 to determine which of the first through sixth TRRS values is the largest, and proceed to step S110 if one of the second through sixth TRRS values is the largest, or proceed to step S110' if the first TRRS value is the largest, to determine whether the largest TRRS value and the rest of the TRRS values are larger than a threshold.

In some embodiments, if the largest TRRS value is larger than the rest of TRRS values and the threshold, proceed to step S112, the CSI corresponding to the largest TRRS value is determined to be matched to the current CSI. If the first TRRS value is larger than the rest of TRRS values and the threshold, proceed to step S114, the normal CSI is determined to be matched to the current CSI.

If the first through sixth TRRS values are smaller than the threshold, return to step S100 to re-send the probe signal from the first transceiver 11.

Furthermore, when the CSI corresponding to the largest TRRS value is matched to the current CSI, the method proceeds to step S116, the corresponding state is determined to be detected.

In an example of FIG. 3, the transmitter 10 is placed in the middle of the front driver's seat and the passenger's seat in the vehicle space VS, and the receiver 11 is placed in the middle of the rear seats of the vehicle space VS. Since the transmitter 10 directly confronts the receiver 11, a strong LOS effect is generated, but with a small number of multipath for reflection or refraction.

Figure 5A:
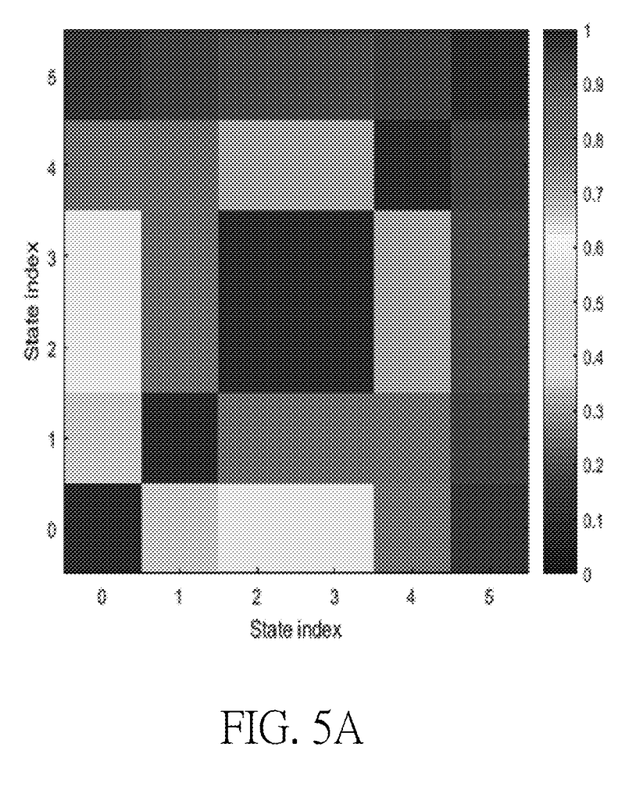
FIGS. 5A and 5B show detection results and normalized detection results for the arrangement of the transmitter and the receiver in FIG. 3.
Figure 5B:
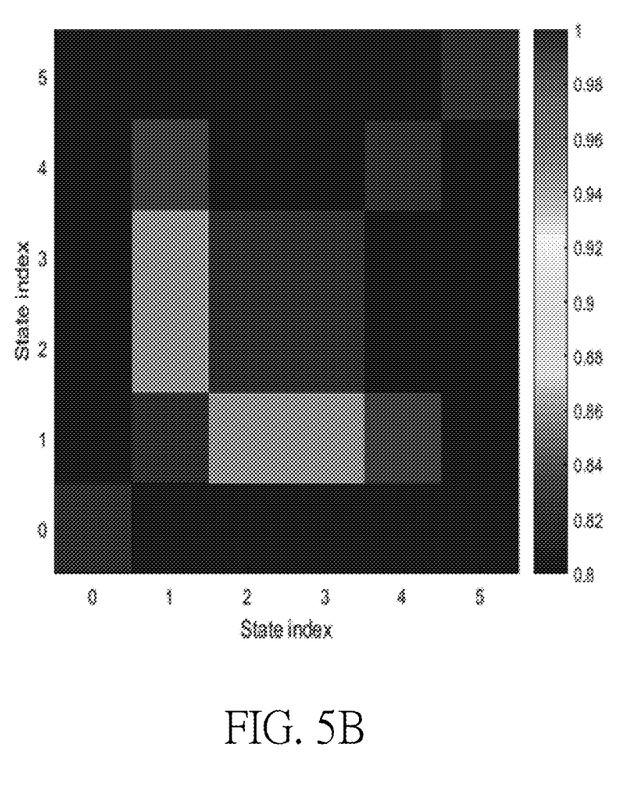

Reference can be made to FIGS. 5A and 5B, which show detection results and normalized detection results for the arrangement of the transmitter and the receiver in FIG. 3. As can be seen in FIGS. 5A and 5B, the detection rates in each of the positions P1 to P6 can be obtained by utilizing TRRS equation, and since the strong LOS effect and the small number of multipaths for reflection or refraction are existed in the present arrangement, the detection rate of the detection results may be low and the error rate may be high.

Figure 6A:
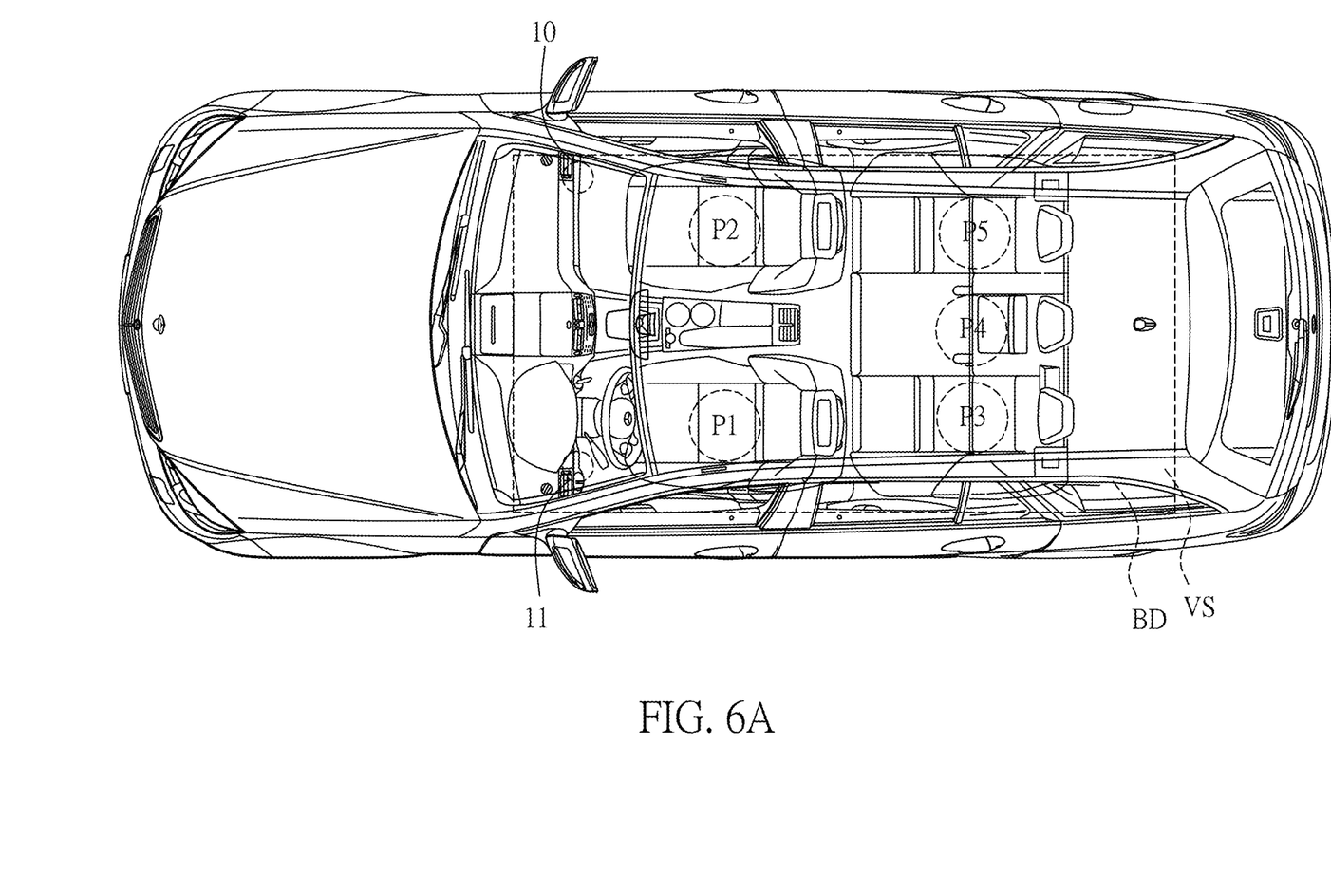
FIGS. 6A, 6B and 6C are diagrams showing another event detection arrangement associated with a positional motion in the vehicle space.
Figure 6B:
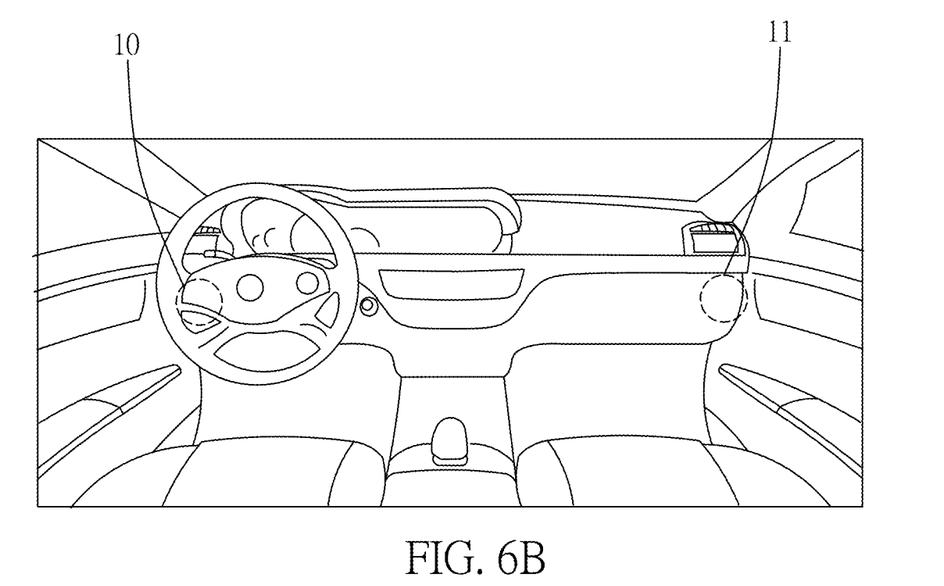
Figure 6C:
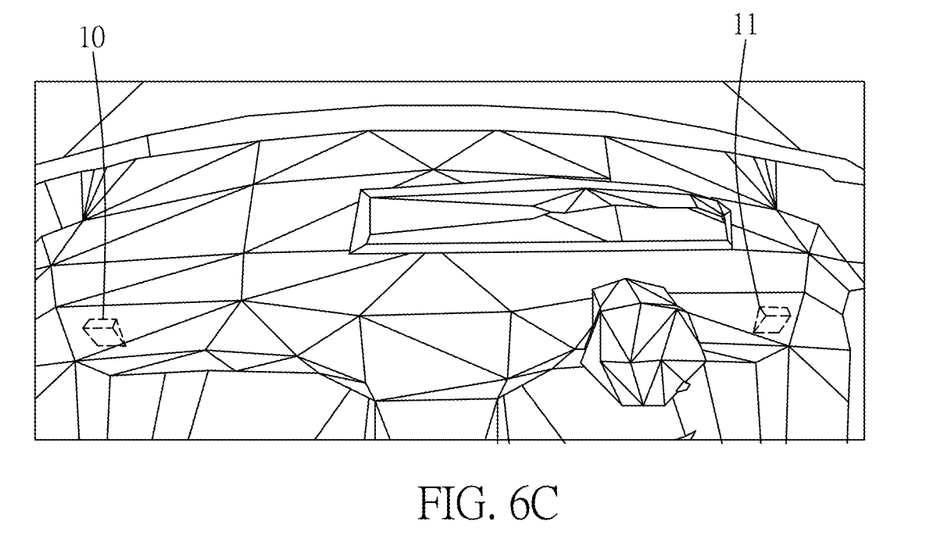

Reference is now made to FIGS. 6A, 6B and 6C, which are diagrams showing another event detection arrangement associated with a positional motion in the vehicle space. As shown in FIGS. 6A, 6B and 6C, the transmitter 10 is placed at a corner close to the front passenger's seat in the vehicle space VS, and the receiver 11 is placed at a corner close to the front driver's seat. Since the transmitter 10 does not directly confront the receiver 11, that is, the first peak gain direction is not directly pointed to the receiver 11 and the second peak gain direction is not directly pointed to the transmitter 10, thus the LOS effect is low, and the arrangement is provided with a large number of multipaths for reflection or refraction.

Figure 7A:
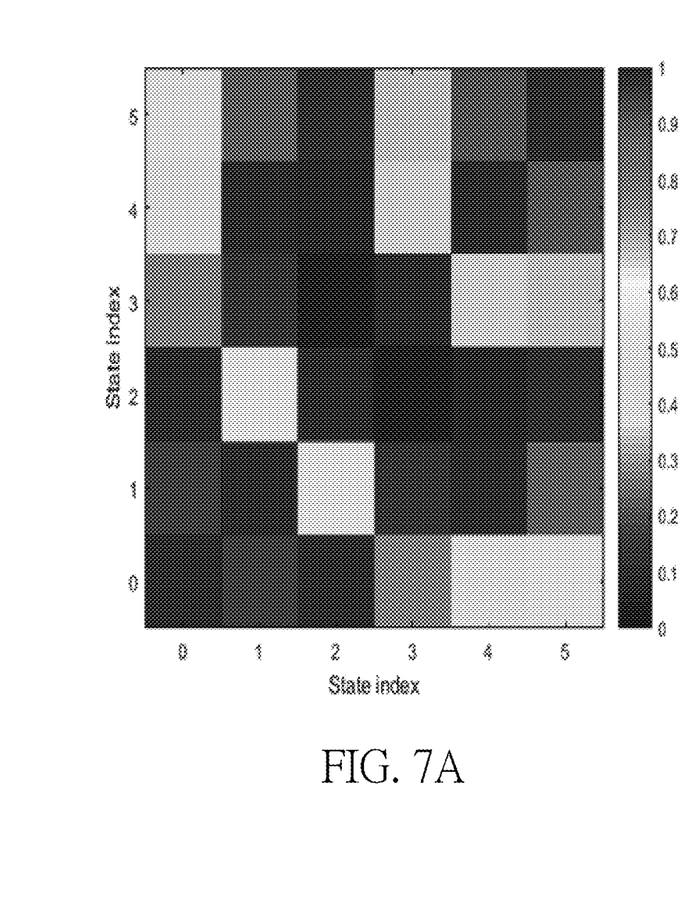
FIGS. 7A and 7B show detection results and normalized detection results for the arrangement of the transmitter and the receiver in FIGS. 6A, 6B and 6C.
Figure 7B:
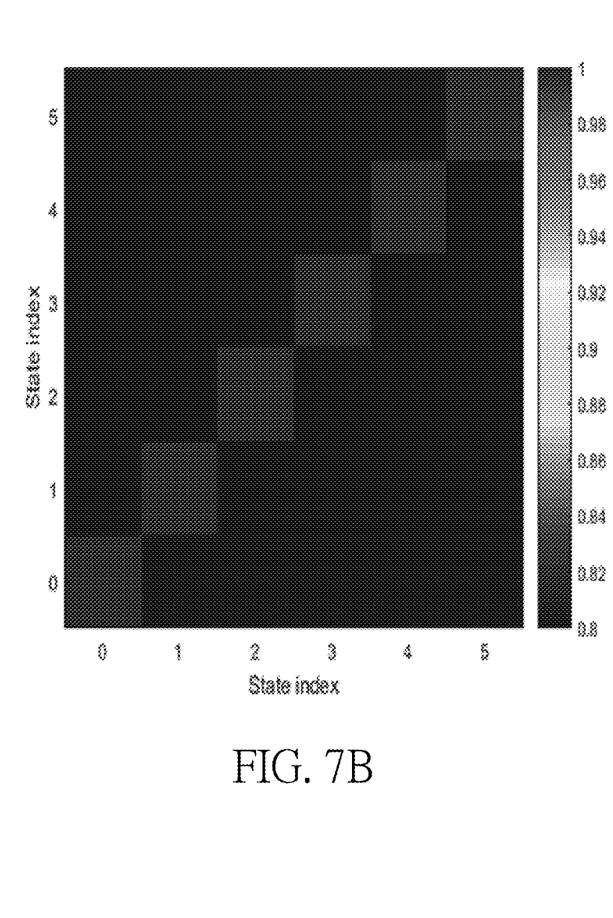

Reference can be made to FIGS. 7A and 7B, which show detection results and normalized detection results for the arrangement of the transmitter and the receiver in FIGS. 6A, 6B and 6C. As can be seen in FIGS. 7A and 7B, the detection rates in each of the positions P1 to P5 can be obtained by utilizing TRRS equation, and since the weak LOS effect and the large number of multipaths for reflection or refraction are existed in the present arrangement, the detection rate of the detection results may be high and the error rate may be low.

Reference is now made back to FIG. 1. The transceiver 10 and the receiver 11 may be coupled to a vehicle 12, and the vehicle 12 may include a plurality of vehicle sensors 120, an engine control unit 121, an on-board diagnostics (OBD) interface 122, and a vehicle power 123. The event detection system 1 can be further combined with other related applications. Since the transmitter 10 and the receiver 11 are placed in the vehicle 12, the power source thereof can be connected to the on-board diagnostics (OBD) port of the OBD interface 122, or powered by a cigarette lighter, or other power supply. Further, the event detection system 1 can also use the OBD Port to obtain other relevant information about the vehicle 12, such as temperature, tire pressure, etc., and the information can be integrated for assisting the event detection.

In order to extend the life of the system after the vehicle 12 is turned off, a large capacitor or a super capacitor bank as the internal battery 103 and 113 to provide power.

Furthermore, the event detection system 1 can also be combined with the vehicle sensors 120 to perform related auxiliary applications, such as temperature sensors, weights, cameras, infrared, GPS, and the like. The receiver 11 can be connected to the network 15 (Internet) to obtain the information inside the vehicle through the short distance communication circuit 116, such as Bluetooth module, connecting to a mobile device, such as a smart phone or laptop, or the receiver 11 can be connected to the network 15 through the long distance communication circuit 117, such as 2.4G or 5G wireless communication circuit, connecting to a base station 13, or other communication methods can be utilized.

In the concept of the event detection system of the present disclosure, the states mentioned herein are not limited to the specified states S0~S5. According to the state of the required detection, the definition of the relevant state can be made, such as the dozing posture, the struggling distortion posture and the like. The behavior of the action, or the specific position of the vehicle, can be detected as long as the defined states in the vehicle are detected.

The notices, warnings, etc. associated with the states can be released to the relevant person, organization, or the like through the buzzer 104, 114 or the LED 105, 115 of the transmitter 10 and the receiver 11. The receiver 11 can be further connected to a display device 16 that belongs to the mobile device 14 or the vehicle 12, such that the notices, warnings, etc. can also be displayed for the user. When any one of events is determined to be occurred, the wireless communication circuit, such as the short distance communication module circuit 116 and the long distance communication module circuit 117, may generate and transmit a first event alarm signal to trigger the buzzer 104, 114, the LED 105 or the display device 16.

The event detection system 1 is also provided for achieving "Car anti-theft security", "Fleet management", "Infant and child safety protection detection", and "Reminder warning for detecting dozing of the driver" functions. For example, the functions are used for monitoring whether a vehicle door is abnormally opened to ensure safety and avoid theft, managing large amount of vehicles, monitoring and analyzing the driver's attention or physiological information status, and the like. If the driver has abnormal driving behavior, the notices or warnings will be provided to avoid accidents such as car accidents caused by the driver's physical discomfort in the vehicle.

The event detection system and method for the vehicle of the present disclosure can obtain sensor information of the vehicle computer through the OBD interface to reduce the probability of False Alarm. For example, the pressure sensor of the seat can detect whether the seat is occupied, and the result of the detection for the states to be detected of the present disclosure can be more accurate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An event detection system for a vehicle, comprising:
   a transmitter disposed at a first position adjacent to a boundary of a space provided in the vehicle, including a first antenna having a transmitting direction; and
   a receiver, disposed at a second position adjacent to the boundary of the space provided in the vehicle, communicating with the transmitter and including a second antenna having a receiving direction, wherein the transmitter is configured to send a probe signal toward the transmitting direction while producing an estimated channel state information (CSI) between the transmitter and the receiver, and the receiver is configured to receive the probe signal, wherein the receiver further includes:
   a processor; and
   a memory connected to the processor, configured to store a preset CSI, wherein the preset CSI includes a first CSI and a normal CSI, wherein the processor is configured to time-reverse and conjugate the estimated CSI to obtain a current CSI from the probe signal by performing a time-reversal process, and to compare the current CSI to the preset CSI,
   wherein when the first CSI is matched to the current CSI, a first event associated with the vehicle is determined to be occurred.

2. The event detection system according to claim 1, wherein the processor is configured to calculate a first time-reversal resonating strength (TRRS) value between the current CSI and the first CSI, and a second TRRS value between the current CSI and the normal CSI; and
   wherein the first CSI is determined to be matched to the current CSI if the first TRRS value is larger than the second TRRS value and a threshold.

3. The event detection system according to claim 2, wherein the preset CSI further includes a second CSI, and the processor is configured to calculate a third time-reversal resonating strength (TRRS) value between the current CSI and the second CSI,
   wherein the third CSI is determined to be matched to the current CSI if the third TRRS value is larger than the first TRRS value, the second TRRS value, and the threshold, and
   wherein when the third CSI is matched to the current CSI, a second event associated with the vehicle is determined to be occurred.

4. The event detection system according to claim 1, wherein the transmitting direction is a first peak gain direction of the first antenna and the receiving direction is a second peak gain direction of the second antenna.

5. The event detection system according to claim 4, wherein the first peak gain direction is not directly pointed to the receiver and the second peak gain direction is not directly pointed to the transmitter.

6. The event detection system according to claim 4, wherein a positional relationship between the first position and the second position provides the non-line of sight link between the transmitter and the receiver when the first peak gain direction is directly pointed to the receiver and the second peak gain direction is directly pointed to the transmitter.

7. The event detection system according to claim 4, wherein the first and second peak gain directions are substantially parallel to each other.

8. The event detection system according to claim 7, wherein first and second projection directions are components projected respectively by the first and second peak gain directions on a ground where the vehicle is placed, and the first and second projection directions are substantially parallel to each other.

9. The event detection system according to claim 4, wherein a first projection direction is a component projected by the first peak gain direction of the first antenna projected on a ground, and the first projection direction is rotatable in a first rotational angle range determined according to a beamwidth of the first antenna with respect to a first direction, and
wherein a second projection direction is a component projected by the second peak gain directions of the second antenna array projected on the ground, and the second projection direction is rotatable in a second rotational angle range determined according to a beamwidth of the second antenna array with respect to a second direction, and
wherein the first direction and the second direction are substantially parallel to each other.

10. The event detection system according to claim 9, wherein the first rotational angle range is determined by subtracting an angle associated with the beamwidth of the first antenna from 180°, and
wherein the second rotational angle range is determined by subtracting an angle associated with the beamwidth of the second antenna array from 180°.

11. The event detection system according to claim 1, wherein the receiver further includes a wireless communication circuit coupled to the processor, wherein when the first event is determined to be occurred, the wireless communication circuit is configured to generate and transmit a first event alarm signal.

12. An event detection method for a vehicle, comprising:
providing a transmitter at a first position adjacent to a boundary of a space provided in the vehicle, wherein the transmitter includes a first antenna having a transmitting direction;
providing a receiver at a second position adjacent to the boundary of the space provided in the vehicle, wherein the receiver includes a second antenna having a receiving direction, a processor and a memory;
configuring the receiver to communicate with the transmitter;
configuring the transmitter to send a probe signal toward the transmitting direction while producing an estimated channel state information (CSI) between the transmitter and the receiver;
configuring the receiver to receive the probe signal;
configuring the memory to store a preset CSI, wherein the preset CSI includes a first CSI and a normal CSI; and
configuring the processor to time-reverse and conjugate the estimated CSI to obtain a current CSI from the probe signal by performing a time-reversal process, and compare the current CSI to the preset CSI,
wherein when the first CSI is matched to the current CSI, a first event associated with the vehicle is determined to be occurred.

13. The event detection method according to claim 12, further including:
configuring the processor to calculate a first time-reversal resonating strength (TRRS) value between the current CSI and the first CSI, and a second TRRS value between the current CSI and the normal CSI, wherein the first CSI is determined to be matched to the current CSI if the first TRRS value is larger than the second TRRS value and a threshold.

14. The event detection method according to claim 13, wherein the preset CSI further includes a second CSI, and the processor is configured to calculate a third time-reversal resonating strength (TRRS) value between the current CSI and the second CSI,
wherein the third CSI is determined to be matched to the current CSI if the third TRRS value is larger than the first TRRS value, the second TRRS value, and the threshold, and
wherein when the third CSI is matched to the current CSI, a second event associated with the vehicle is determined to be occurred.

15. The event detection method according to claim 12, wherein the transmitting direction is a first peak gain direction of the first antenna and the receiving direction is a second peak gain direction of the second antenna.

16. The event detection method according to claim 15, wherein the first peak gain direction is not directly pointed to the receiver and the second peak gain direction is not directly pointed to the transmitter.

17. The event detection method according to claim 15, wherein the first and second peak gain directions are substantially parallel to each other.

18. The event detection method according to claim 17, wherein first and second projection directions are components projected respectively by the first and second peak gain directions on a ground where the vehicle is placed, and the first and second projection directions are substantially parallel to each other.

19. The event detection method according to claim 15, wherein a first projection direction is a component projected by the first peak gain direction of the first antenna projected on a ground, and the first projection direction is rotatable in a first rotational angle range determined according to a beamwidth of the first antenna with respect to a first direction, and
wherein a second projection direction is a component projected by the second peak gain directions of the second antenna array projected on the ground, and the second projection direction is rotatable in a second rotational angle range determined according to a beamwidth of the second antenna array with respect to a second direction, and
wherein the first direction and the second direction are substantially parallel to each other.

20. The event detection method according to claim 19, wherein the first rotational angle range is determined by subtracting an angle associated with the beamwidth of the first antenna from 180°, and
wherein the second rotational angle range is determined by subtracting an angle associated with the beamwidth of the second antenna array from 180°.

* * * * *